(12) United States Patent
Park et al.

(10) Patent No.: US 6,466,590 B1
(45) Date of Patent: Oct. 15, 2002

(54) DEVICE AND METHOD FOR PROCESSING CELL GROUP IN A COMMON MEMORY SWITCH

(75) Inventors: Chang-Jin Park, Kyonggi-do (KR); Jae-Hun Jeong, Kyonggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/439,572

(22) Filed: Nov. 12, 1999

(30) Foreign Application Priority Data

Nov. 11, 1998 (KR) .............................. 98-48174

(51) Int. Cl.[7] .................................. H04J 3/04

(52) U.S. Cl. .................................. 370/535

(58) Field of Search .................. 370/535, 395–419, 370/388–390, 378, 391–394, 352–360, 426–427, 267; 379/284

(56) References Cited

U.S. PATENT DOCUMENTS

| | | | | |
|---|---|---|---|---|
| 5,117,420 A | * | 5/1992 | Hillis et al. | 370/400 |
| 5,452,297 A | * | 9/1995 | Hiller et al. | 370/395 |
| 6,023,469 A | * | 2/2000 | Sung et al. | 370/398 |

FOREIGN PATENT DOCUMENTS

| | | |
|---|---|---|
| JP | 7-504789 | 5/1995 |
| JP | 07-321795 | 12/1995 |
| JP | 10-294740 | 11/1998 |
| WO | 93/19550 | 9/1993 |

* cited by examiner

*Primary Examiner*—Kwang Bin Yao
*Assistant Examiner*—Prenell Jones
(74) *Attorney, Agent, or Firm*—Klauber & Jackson; Steve Cha

(57) ABSTRACT

The present invention is related to a device and method for processing a cell group in a common memory switch, in which output ports in the common memory switch are divided into an individualized output port group associated with only one output port and a grouped output port group associated with a plurality of output ports, wherein each output port is assigned to a unique group number.

9 Claims, 6 Drawing Sheets

FIG. 1 [PRIOR ART]

FIG. 6A
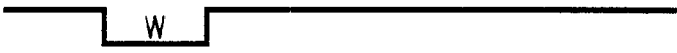
FIG. 6B

DEVICE AND METHOD FOR PROCESSING CELL GROUP IN A COMMON MEMORY SWITCH

CLAIM OF PRIORITY

This application makes reference to, incorporates the same herein, and claims all benefits accruing under 35 U.S.C. section 119 from an application for DEVICE AND METHOD FOR PROCESSING CELL GROUP IN COMMON MEMORY SWITCH filed in the Korean Industrial Property Office on Nov. 11, 1998 and assigned Serial No. 98-48174.

BACKGROUND OF THE INVENTION

1. Field of the Invention

The present invention relates generally to a common memory switch. In particular, to a cell grouping processing device and method for grouping input/output (I/O) ports.

2. Description of the Related Art

It is known that an exchange system for switching between subscribers is generally provided with a switch. The switch may be embodied in many ways for switching information received through a predetermined input port to a corresponding output port.

Many different types of switches may be used in each exchange system. It would be virtually impossible and of little value to describe all the switch types for exchange systems herein. However, four major design schemes of an asynchronous transfer mode (ATM) switch will be described instead: 1) a shared memory switch; 2) a shared medium switch; 3) a fully interconnected switch; and 4) a space division switch.

Among the aforementioned switches, a common memory switch (or a common buffer switch) is typically used in an ATM exchange system, and its conventional structure is illustrated in FIG. 1.

Referring to FIG. 1, cells are applied to first, second, and third input ports $P_{in}$ 0, $P_{in}$ 1, and $P_{in}$ 2 among four input ports $P_{in}$ 0 to $P_{in}$ 3. It is to be assumed that the first, second, and third input ports $P_{in}$ 0, $P_{in}$ 1, and $P_{in}$ 2 are the counterparts of fourth, third, and first output ports $P_{out}$ 3, $P_{out}$ 2, and $P_{out}$ 0, respectively.

In a cell input operation, cells are fed to a multiplexer (MUX) 110 through the corresponding input ports, and the MUX 110 multiplexes the cells into a cell stream. As shown in FIG. 1, for example, the MUX 110 converts the cells received in parallel through the input ports $P_{in}$ 0 to $P_{in}$ 3 into a serial cell stream in time division according to the input order and the order of accessing the input ports.

Each cell includes a header for cell routing. This header is extracted from the cell and transmitted to a header converter 140. The extracted header provides information about a destination output port for a corresponding cell. The structure for extracting the header and its operation are a well-known technology and thus their description and illustration is omitted.

The header converter 140 determines whether a cell corresponding to the extracted header is valid or not. Subsequently, an idle address pool (IAP) 170 assigns only a valid cell an available cell address of a common memory 120 in response to a valid check signal RD_IAP received from the header converter 140. In FIG. 1, cell addresses "a, b, and c" are assigned to cells having output port designating information "3, 2, and 0", respectively, and the cells output from the MUX 110 are stored at the assigned cell addresses in the common memory 120.

While the header converter 140 stores the cells, it simultaneously checks the output ports through which the stored cells will be transmitted, and generates signals WR0 to WR3 to enable the first to fourth AFIFO (Address First In First Out) buffers 152 to 158, in which the cell addresses will be stored. The AFIFO buffers 152 to 158, which have been enabled by the signals WR0 to WR3, store the cell addresses received from the IAP 170.

An example of the above is when a cell applied to the input port $P_{in}$ 0 and destined for the output port $P_{out}$ 3 is assigned a cell address 'a' from the IAP 170. The cell address "a" is stored in the fourth AFIFO buffer 158 enabled by the signal WR3 received from the header converter 140.

During a cell output operation, a read timing generator 180 generates read signals RD0 to RD3 for sequentially reading the cell addresses stored in the first to fourth AFIFO buffers 152 to 158. The read cell addresses are applied to the input of a MUX 160 in different paths. The MUX 160 multiplexes the cell addresses and feeds the multiplexed cell addresses to the common memory 120. "c, b, and a" are examplarily shown to be fed to the common memory 120 and the common memory 120 outputs the stored cells from the cell addresses "c, b, and a" in FIG. 1. Here, "c, b, and a" are arranged in the multiplexed order. In some cases, the common memory 120 reads a vacant AFIFO buffer such as the second AFIFO buffer 154 and then outputs an idle cell. A cell indicated by "xx" is an idle cell in FIG. 1.

A demultiplexer (DEMUX) 130 demultiplexes the cells received from the common memory 120 and outputs the demultiplexed cells to their destination output ports.

Meanwhile, the MUX 160 returns the cell addresses to the IAP 170 for the next use as well as feeds them to the common memory 120. An address checker 190 is located in the returning path to determine whether the returned cell addresses have errors, returns only error-free cell addresses to the IAP 170, and discards cell addresses having errors.

As described above, the input ports and the output ports operate individually in the conventional common memory ATM switch. Therefore, once a cell has been applied to a specific input port, it is directed only to an output port being the counterpart of that specific input port. That is, since each address buffer acts individually, a cell applied to each input port at 155 Mbps, for example, is processed only by a switch with a port rate 155 Mbps. For example, if a common memory ATM switch is a 4×4 switch having a cell input rate of 155 Mbps, it cannot operate with use of a 2×2 switch with a cell input rate of 310 Mbps. Thus, constraints are imposed on use of a switch module in designing a system.

SUMMARY OF THE INVENTION

It is, therefore, an object of the present invention to provide a common memory switch for enabling group switching and a processing method thereof.

It is another object of the present invention to provide a common memory switch and a processing method thereof, in which an individual port can be used as a grouped port, as well as in an individualized port by utilizing an internal buffer and a buffer manager, in order to increase the efficiency of a switch module.

To achieve the above objects, the present invention provides a device and method for processing a cell group in a common memory switch. Output ports in the common memory switch are divided into an individualized output port group with only one output port as an element, and a grouped output port group with a plurality of output ports as elements, and each output port is assigned to a unique group number. According to an embodiment of the present invention, the cell group processing device includes a multiplexer for multiplexing cells received through input ports. A header converter sequentially receives headers extracted from the multiplexed cells, determines whether the cells are valid, and generates a valid verified signal, and a group signal for a valid cell. An idle address generator sequentially assigns idle addresses at which cells are stored in response to the valid verified signal, and a processor provides the initial grouping information and the initial address buffer select information when a switch module is initialized. A group information memory includes a first table for storing the initial grouping information, and determines grouping information corresponding to the group signal referring to the first table. An address buffer select memory includes a second table for storing the initial address buffer select information, and for then replacing the initial address buffer select information with next address buffer select information upon reception of the next address buffer select information, and determines address buffer select information corresponding to the group signal referring to the second table. An address buffer select information generator receives the grouping information and the address buffer select information, determines the next address buffer select information, and outputs the next address buffer select information to the address buffer select memory. A plurality of address buffers are enabled by the address buffer select information to store idle addresses assigned by the idle address generator, and a common memory stores the cells received from the multiplexer at the idle addresses.

BRIEF DESCRIPTION OF THE DRAWINGS

The above and other objects, features and advantages of the present invention will become more apparent from the following detailed description when taken in conjunction with the accompanying drawings in which:

FIG. 6A illustrates an example of write request signals generated from a header converter shown in FIG. 3; and, FIG. 6B illustrates an example of read request signals generated from a read timing generator shown in FIG. 3.

A DETAILED DESCRIPTION OF THE PREFERRED EMBODIMENTS

Preferred embodiments of the present invention will be described hereinbelow with reference to the accompanying drawings. For the purpose of clarity, some fluctions or constructions are not described in detail because they are well known to persons of ordinary skill in the art and would obscure the invention with unnecessary detail.

Figure 2:
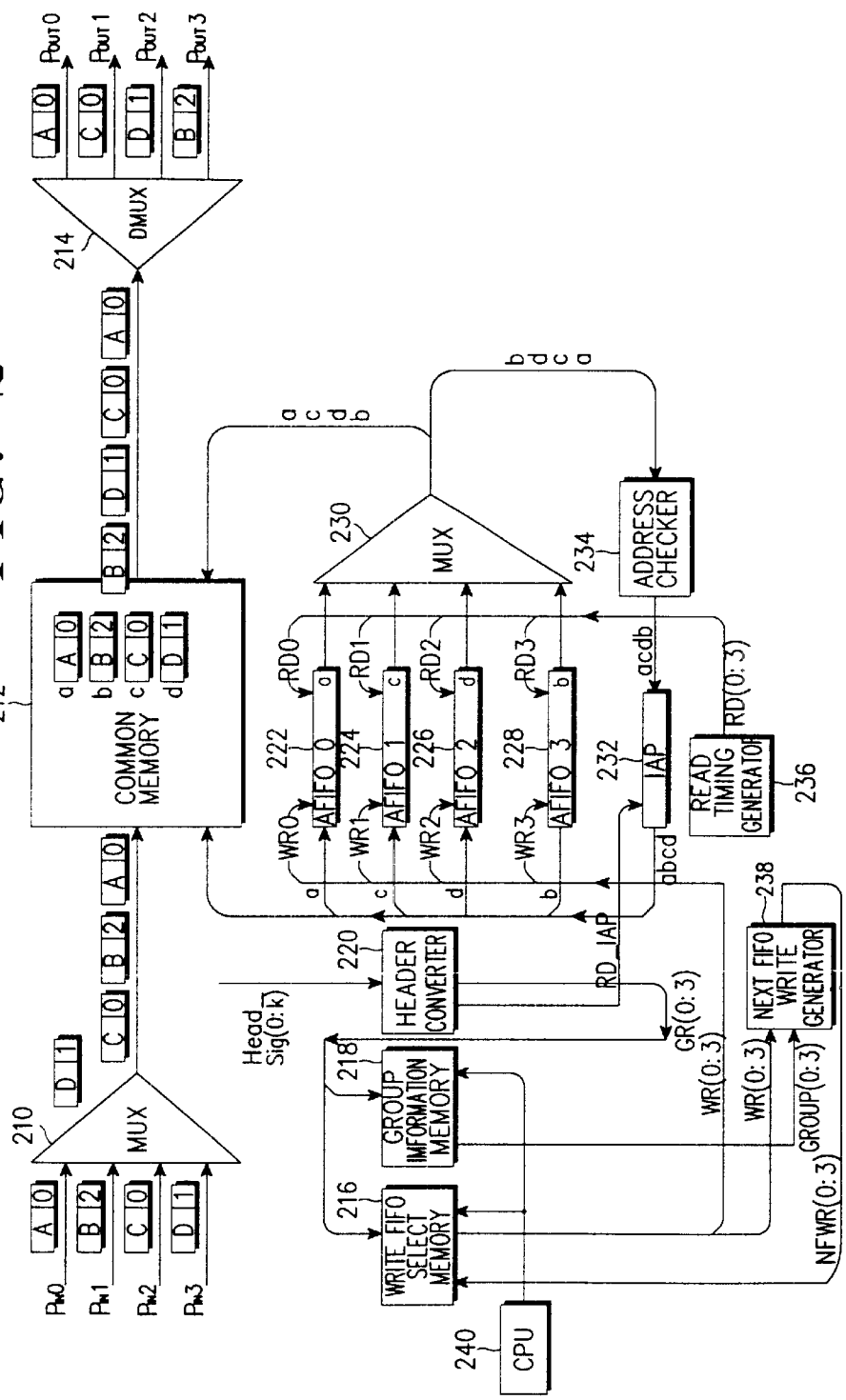
FIG. 2 is a block diagram of a common memory switch according to an embodiment of the present invention.

FIG. 2 is a block diagram of a common memory switch according to a first preferred embodiment of the present invention. Referring to FIG. 2, the common memory switch has an equal number of input ports as it has output ports. The input ports are divided into individualized ones and grouped ones, and the output ports are also divided into individualized ones and grouped ones. An individualized input/output port individually processes only one cell, and a grouped input/output port processes one cell as an element of a group. Each input or output port is assigned a unique number. A cell applied to an input port includes a body and a header which indicates the group number of an intended output port. It is preferable to have unique group numbers for the total number of output ports, to be prepared for the case in which all the output ports are used as individualized output ports. For example, if there are four output ports, four group numbers are necessary. A group number can be expressed as GR(0:3) in this case. If each group number is assigned to a corresponding output port, and then at least two output ports are grouped, a desired one of the two assigned group numbers is used.

Figure 1:
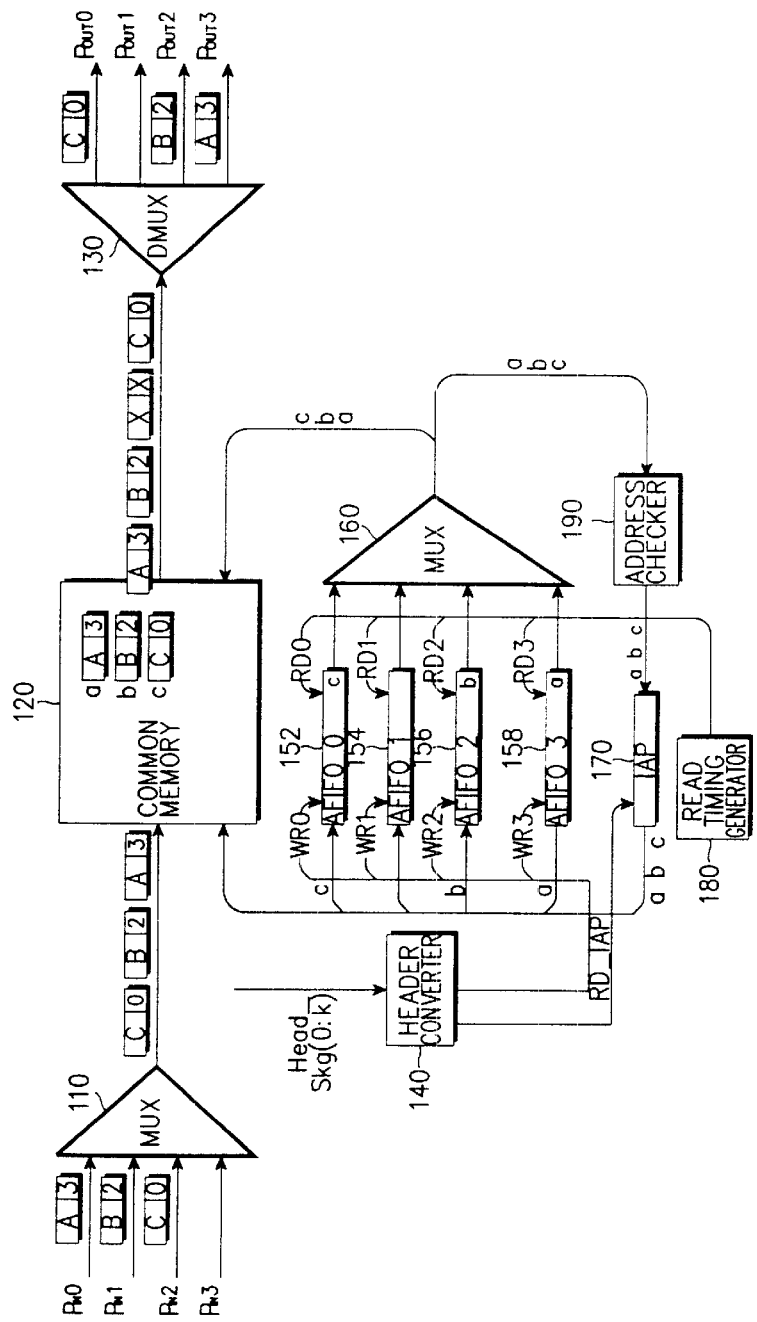
FIG. 1 is a block diagram of a typical prior art common memory switch.

According to above assumption, the first preferred embodiment of the present invention further includes a write FIFO select memory 216, a group information memory 218, and a next FIFO write generator 238, in addition to the prior art structures shown in FIG. 1.

More specifically, a first MUX 210 multiplexes cells received from both individualized or grouped input ports. In FIG. 2, cells have the structures of body A/header 0, body B/header 2, body C/header 0, and body D/header 1.

A header converter 220 sequentially receives the headers Head_sig(0:K) extracted from the multiplexed cells, and determines whether the cells are valid or not. If a cell is valid, the header converter 220 generates a valid verified signal RD_IAP and the group number of the cell. As previously mentioned, the group number is the number of an individualized or grouped output port to which the cell will be transmitted. In FIG. 2, four group numbers (i.e., GR(0:3)) are assigned to the four output ports. If the first output port $P_{out}$ 0 and the second output port $P_{out}$ 1 are bound in a group, three of the four assigned group numbers are used (i.e., GR(0:2). It is to be noted that four group numbers are expressed as GR(0:3) to indicate the number of group numbers and three group numbers are expressed as GR(0:2) to indicate that three group numbers are used.

An IAP 232 sequentially assigns cell addresses in response to the valid verified signal RD_IAP. The assigned cell addresses are equal or greater than the number of any address buffers, and the cell addresses are recursively assigned. The number of AFIFO buffers 222 to 228 is determined by the number of the input or output ports. If cell addresses are "a, b, c, and d", they are assigned in the order of "a→b→c→d→a→b→c . . . ".

A central processing unit (CPU) 240 is an upper processor for providing an overall control to the system. The CPU 240 stores initial write FIFO select information and initial grouping information corresponding to group numbers. Upon initial reception of cells in the input ports, the CPU 240 feeds the initial grouping information and the initial write FIFO select information to the group information memory 218 and the write FIFO select memory 216.

The group information memory 218 stores the information that identifies whether a specific input/output port is grouped or individualized. The contents of the memory 218 are written by the CPU 240 upon initialization of a switch module, such as the structure of FIG. 2. During the write operation, a grouped or individualized port is set to "1". For example, if ports 0 and 1 are grouped, and ports 2 and 3 are individualized in a 4×4 switch, the CPU 240 writes the information as listed in (table 1) in the group information memory 218. Thus, if more than one port in any one row of Table 1 is set to one, the ports are grouped together.

TABLE 1

| group number | initial grouping information | | | |
|---|---|---|---|---|
| | D | C | B | A |
| 0 | 0 | 0 | 1 | 1 |
| 1 | 0 | 1 | 0 | 0 |
| 2 | 1 | 0 | 0 | 0 |

A to D in (table 1) indicates first to fourth output ports. According to (table 1), the grouping information memory 218 has information about three groups. Group 0 is set to "0011", implying that the first and second output ports A and B are grouped. Group 1 and group 2 are set to "0100" and "1000", indicating that their respective elements are third and fourth output ports. The group information memory 218 outputs the initial grouping information of a group designated by a group number GR(0:3) received from the header converter 220 as grouping information. For example, upon reception of "GR1" indicating group 1 from the header converter 220, the group information memory 218 outputs "0100."

The CPU 240 writes the initial write FIFO select information in the write FIFO select memory 216 when the switch module is initialized. The write FIFO select memory 216 generates write signals WR(0:3) to be fed to the first to fourth AFIFO buffers 222 to 228 for storing cell addresses, according to the group numbers GR(0:3) received from the header converter 220. A write signal WR(0:3) is generated based on the write FIFO select information corresponding to a group indicated by the group number GR(0:3). For example, if ports 0 and 1 are grouped and ports 2 and 3 are individualized in a "4×4 switch, initial write FIFO select information is written in the write FIFO select memory 216 as follows.

TABLE 2

| group number | write signal | write FIFO select information | | | |
|---|---|---|---|---|---|
| | | D WR(3) | C WR(2) | B WR(1) | A WR(0) |
| 0 | WR(0) | 0 | 0 | 0 | 1 |
| | WR(1) | 0 | 0 | 1 | 0 |
| 1 | WR(2) | 0 | 1 | 0 | 0 |
| 2 | WR(3) | 1 | 0 | 0 | 0 |

In (table 2), A to D are first to fourth output ports. Each group is assigned to a unique group number. Write FIFO select information for each group corresponds to a write signal WR(0:3) used to designate the first to fourth AFIFO buffers 222 to 228 as stated before. For example, upon reception of "GR1" indicating port 2 from the header converter 220, the write FIFO select memory 216 outputs the write FIFO select information "0100" as a write signal WR(2) since "GR1" indicates group 1. Here, the initial write FIFO select information for groups 1 and 2 is maintained unchanged since each of the groups has an individualized port as its element, whereas the initial write FIFO select information for group 0 having a plurality of ports grouped is changed by the write FIFO select memory 216. For example, every time when cells destined to the ports 0 or 1 in group 0, the next FIFO write generator 238 writes the write FIFO select information "0001(WR(0)) or 0010(WR(1))" in the write FIFO select memory 216, for alternately selecting the first and second AFIFO buffers 222 and 224.

The next FIFO write generator 238 generates next writes the FIFO select information indicating an AFIFO buffer to store the next input cell, based on the grouping information received from the group information memory 218 and the write FIFO select information received from the write FIFO select memory 216, and feeds the next write FIFO select information to the write FIFO select memory 216.

The other components of the common memory switch, which are not described herein, are the same in operation as the counterparts of the conventional common memory switch shown in FIG. 1. Therefore, a description of these components will be omitted.

Prior to describing the operation of the common memory switch according to the first preferred embodiment of the present invention with reference to (table 1) and (table 2), it is to be appreciated that the following description is conducted mainly on the additional components to the conventional common memory switch; that is, the group information memory 220, the write FIFO select memory 216, and the next FIFO write generator 238. As previously discussed, it is to be assumed that the first and second output ports are bound into one group and the third and fourth output ports are individualized. Therefore, four group numbers (i.e., GR(0:3)) are assigned but group numbers generated from the header converter 220 are limited to three (GR(0:2)) since only three group numbers are used herein.

Referring to FIG. 2 and (table 1) & (table 2), output ports 0 and 1 are grouped in group 0, output port 2 is as an individualized output port in group 1, and output port 3 is as an individualized output port in group 2. The grouping is specified as the initial grouping information in the group information memory 218 by the CPU 240 upon initialization of a switch module. Therefore, addresses should be set for groups 0, 1, and 2 in the group information memory 218. That is, "0011", "0100", and "1000" are set as the addresses for the groups 0, 1, and 2, respectively, referring to (table 1).

Upon initialization of the switch module, the CPU 240 also sets initial write FIFO select information in the write FIFO select memory 216. Referring to (table 2), "0001" and "0010" are set to select the first and second AFIFO buffers 222 and 224 for group 0, "0100" is set to select the third AFIFO buffer 226 for group 1, and "1000" is set to select the fourth AFIFO buffer 228 for group 2.

After the initialization, the MUX 210 multiplexes cells received from the input ports $P_{in}$ 0 to $P_{in}$ 3 and outputs the multiplexed cells according to order of input. Referring to FIG. 2, cells are applied to the MUX 210 in the order from input port 0 to input port 3. The header converter 220 extracts header information from the headers of the multiplexed cells received from the MUX 210 and generates a group signal GR(0:2) and a valid verified signal RD IAP.

The IAP 232 receives the valid verified signal RD_IAP, considers the valid verified signal RD_IAP to be an address assignment request, and assigns an idle address. The idle address is an address of the common memory 212 at which a cell corresponding to the valid verified signal is stored, and available addresses are recursively assigned. For example, let the available addresses be "a, b, c, and d". Then, they are assigned in the order of "a→b→c→d→a→b→c . . . ". The assigned idle address is fed to the common memory 212. The common memory 212 sequentially stores cells at their assigned addresses in the input order.

Idle addresses are stored in the AFIFO buffers 222 to 228 based on the group numbers GR(0:2) received from the header converter 220 in order to output the stored cells later.

The group numbers GR(0:2) are applied to the group information memory 218 and the write FIFO select memory 216. The group information memory 218 has the initial grouping information as shown in (table 1), and the write FIFO select memory 216 has the initial write FIFO select information as shown in (table 2). Upon reception of the group information GR(0:2), the group information memory 218 outputs corresponding initial grouping information referring to the internal table and the write FIFO select memory 216 outputs corresponding write FIFO select information referring to its internal table. For example, if the header converter 220 outputs group information GR(0) indicating group 0, the group information memory 218 outputs grouping information "0011" referring to the table such as (table 1), and the write FIFO select memory 216 outputs write FIFO select information "0001" referring to the table such as (table 2). Here, the write FIFO select information is used as a write signal WR(0:3) for enabling an AFIFO buffer to temporarily store an idle address. The AFIFO buffer 222 is enabled by the write FIFO select information "0001". The following table lists AFIFO buffers selected by write FIFO select information, namely, write signals.

TABLE 3

| write FIFO select information | AFIFO buffer | group number |
|---|---|---|
| 0001 | AFIFO 0 | group 0 |
| 0010 | AFIFO 1 | group 0 |
| 0100 | AFIFO 2 | group 1 |
| 1000 | AFIFO 3 | group 2 |

In response to the valid verified signal RD__IAP received from the header converter 220, the IAP 232 generates a corresponding idle address, and the idle address is stored in the enabled AFIFO buffer.

The above operation will be described in more detail, referring to (table 1) and (table 2). The header converter 220 outputs a group signal GR(0) for the input of the first cell, a group signal GR(2) for the input of the second cell, the group signal GR(0) for the input of the third cell, and a group signal GR(1) for the input of the fourth cell. The header converter 220 outputs the valid verified signal RD__IAP together with the group signals so that the IAP 232 sequentially outputs idle addresses "a, b, c, and d".

The group signals are sequentially applied to the group information memory 218 and the write FIFO select memory 216. The group information memory 218 sequentially outputs grouping information "0011", "1000", "0011", and "0100" corresponding to the group signals referring to (table 1). The write FIFO select memory 216 sequentially outputs write FIFO select information "0001", "1000", "0010", and "0100" corresponding to the group signals referring to (table 2). The first, fourth, second, and third AFIFO buffers 222, 228, 224, and 226 are sequentially enabled in this order by the write FIFO select information "0001", "1000", "0010", and "0100". The idle addresses "a, b, c, and d" generated from the IAP 232 are stored in the AFIFO buffers 222 to 228 in the enabled order. That is, the AFIFO buffer 222 is enabled by the write FIFO select information "0001" at the time when the idle address "a" is output and the idle address "a" is stored in the address buffer 222. The AFIFO buffer 228 is enabled by the write FIFO select information "1000" at the time when the idle address "b" is output and the idle address "b" is stored in the AFIFO buffer 228.

However, when cells (such as the first and third cells of FIG. 2) are to be transmitted to output ports of the same group, problems can be raised in assigning AFIFO buffers. That is, a plurality of AFIFO buffers corresponding to a group should be assigned properly when the AFIFO buffer assignment is performed in the above procedure. This is why the next FIFO write generator 238 is added in the present invention. The next FIFO write generator 238 receives the grouping information, determines whether a cell is grouped or individualized, and determines next FIFO write information. For example, upon reception of "0011" and "0001" as the grouping information and the write FIFO select information for the first cell, the next FIFO write generator 238 recognizes that the first cell is grouped by "0011". Then, the next FIFO write generator 238 provides "0010" as next FIFO write information NFWR (0:3) for selecting an AFIFO buffer to store the other cell in the same group in the write FIFO select memory 216, replacing the previous write FIFO select information for group 0. That is, "0001" for group 0 in (table 2) is changed to "0010" so that the AFIFO buffer 224 is enabled by "0010" for the other group signal of group 0. If a corresponding cell is individualized, the next FIFO write generator 238 need not change the write FIFO select information in the write FIFO select memory 216 and thus outputs the received write FIFO select information, so that one AFIFO buffer is assigned for an individualized output port. That is, two AFIFO buffers are sequentially assigned to the first and third cells in group 0. According to the number of ports in the same group, as many AFIFO buffers are sequentially enabled for the ports in the group.

Therefore, the first cell is destined for an output port of group 0 and thus its address is stored in the AFIFO buffer 222. The second cell is destined for the output port of group 2 and thus its address is stored in the AFIFO buffer 228. The third cell is destined for an output port of group 0 and thus its address is stored in the AFIFO buffer 224. The fourth cell is destined for the output port of group 1 and thus its address is stored in the AFIFO buffer 226.

The cells stored in the common memory 212 are output according to the idle addresses received from the first to fourth AFIFO buffers 222 to 228 in the following procedure. A read timing generator 236 sequentially outputs read signals RD0 to RD3 of a predetermined period. The first to fourth AFIFO buffers 222 to 228 are sequentially enabled by the read signals RD0 to RD3, and output the stored idle addresses at the enabled time period. Referring to FIG. 2, the idle addresses "a, c, d, and b" are output from the respective AFIFO buffers 222 to 228 by the read signals RD0 to RD3.

The MUX 230 multiplexes the idle addresses received from the AFIFO buffers 222 to 228 and outputs "a, c, d, and b" in this order. Upon reception of the idle addresses from the MUX 230, the common memory 212 sequentially outputs the cells with "A", "C", "D", and "B" as their bodies. A DEMUX 214 demultiplexes the cells received from the common memory 212 and outputs the demultiplexed cells to their destination output ports.

Meanwhile, an address checker 234 receives the idle addresses from the MUX 230, determines whether the idle addresses include any errors, and applies the idle addresses to the IAP 232 for the next use.

Figure 3:
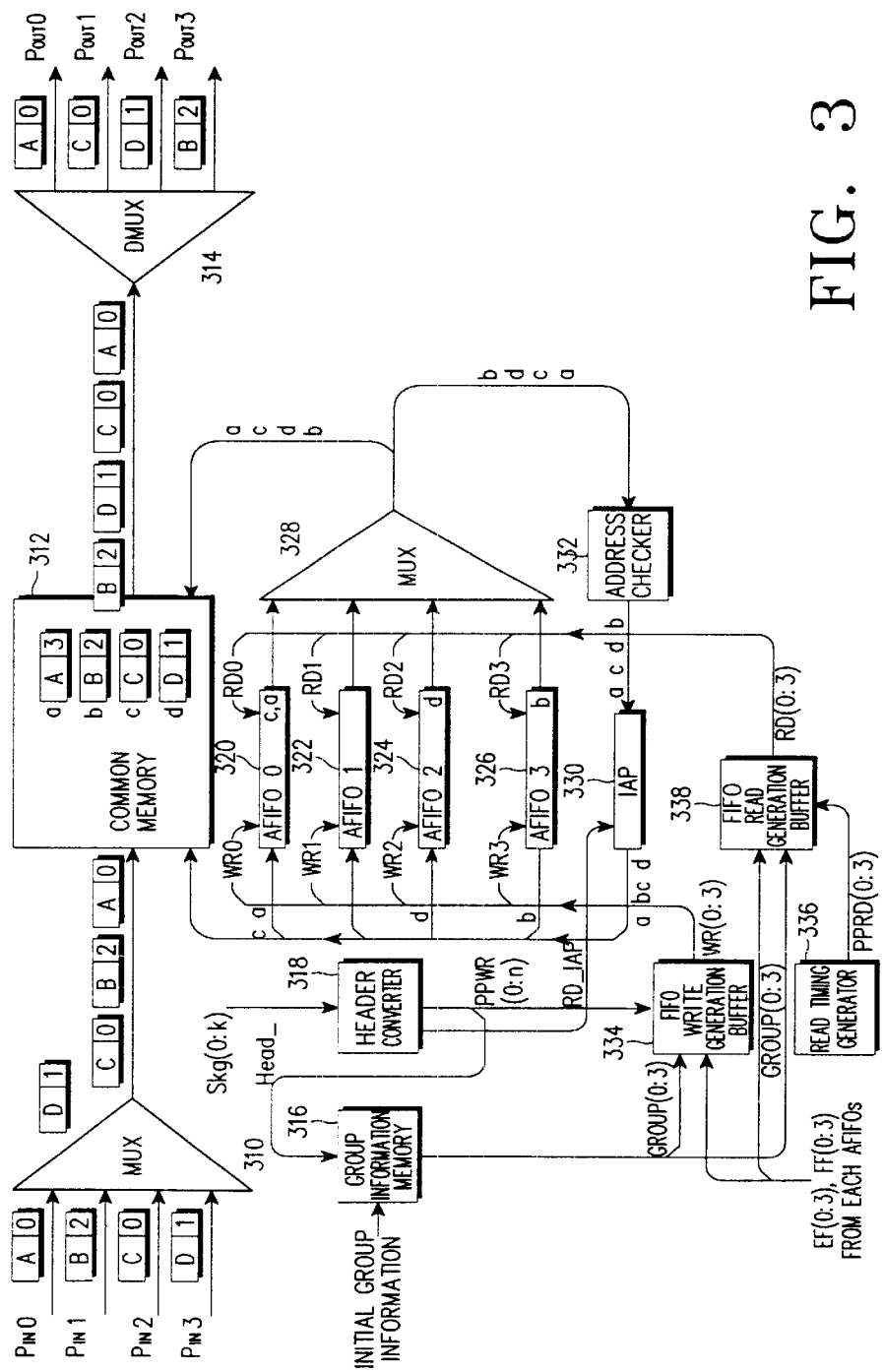
FIG. 3 is a block diagram of a common memory switch according to another embodiment of the present invention.

FIG. 3 illustrates a common memory switch according to a second preferred embodiment of the present invention. In both the first and second embodiments, the common memory switch has input ports as many as output ports, and the output ports are divided into individualized output ports and grouped output ports in the same manner, and the cells have the same structure.

Referring to FIG. 3, the common memory switch includes a group information memory 316, a FIFO write generation buffer 334, and a FIFO read generation buffer 338 in addition to the components shown in FIG. 1.

More specifically, the header converter 318 sequentially receives headers Head_sig(0:K) extracted from multiplexed cells, determines whether the cells are valid or not based on the headers, and if a cell is valid it generates the valid verified signal RD_IAP and a write request signal PPWR (0:n). A group signal indicative of an intended output port can be used as the write request signal.

The group information memory 316 stores information about what output ports belong to a group. The information is listed in a predetermined table by a processor when a switch module is initialized and is read only in a normal operation. The address at which the information is stored in the group information memory 316 is a write request signal and information corresponding to the write request signal is initial grouping information. For example, grouping information is stored in 4 bits in the memory of a 4×4 switch module while each bit indicates a corresponding output port, and a grouped port is set to 1. If "0011" is stored at an address "0", group 0 has ports 0 and 1.

Figure 4A:
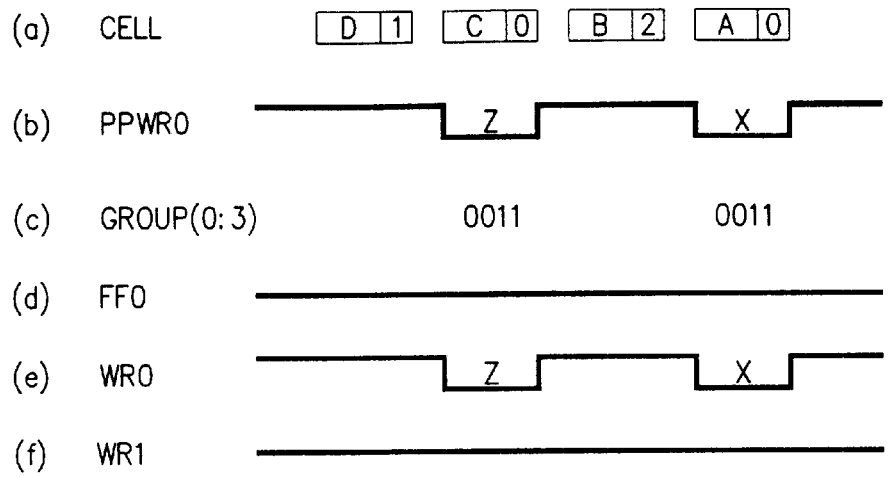
FIGS. 4A and 4B are timing diagrams of signal waveforms in an operation of a FIFO write generation buffer shown in FIG. 3.
Figure 4B:
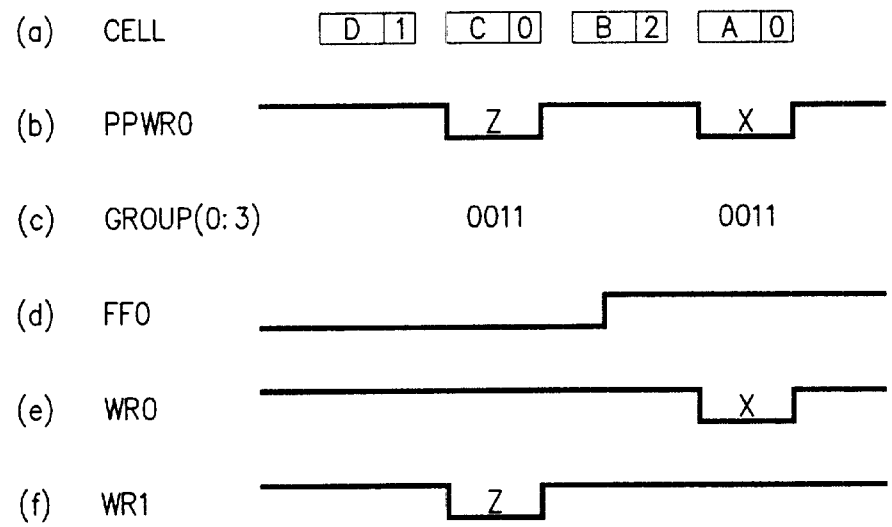

The FIFO write generation buffer 334 generates a write signal WRn based on the grouping information of a corresponding cell, the write request signal received from the header converter 318, and the buffer status signal FF of the other port in the group to which a corresponding port belongs. Examples of write signals WR are shown in FIGS. 4A and 4B. On the assumption that ports 0 and 1 are grouped in group 0 and two cells are destined for the output ports of group 0, FIG. 4A illustrates the waveforms of write signals when it is determined from the signal FF that the first AFIFO buffer 320 is empty and FIG. 4B illustrates the waveforms of write signals when it is determined from the signal FF that the first AFIFO buffer 320 is not empty. In FIG. 4A, the addresses of the two cells are stored in the first AFIFO buffer 320. In FIG. 4B, one address of the two addresses is stored in the first AFIFO buffer 320 and the other address is stored in the second AFIFO buffer 322. That is, the FIFO write generation buffer 334 generates a write signal for one port according to the status of an AFIFO buffer corresponding to the other port of the same group.

Figure 5A:
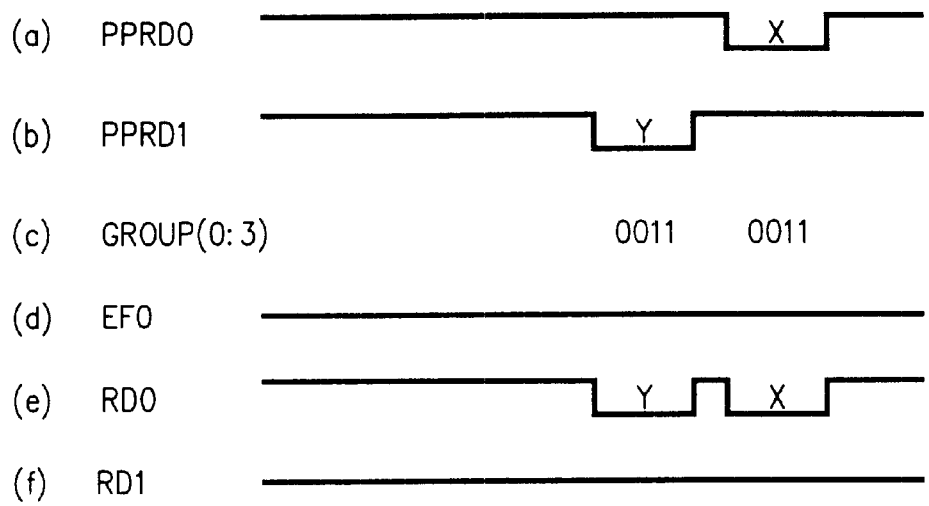
FIGS. 5A and 5B are timing diagrams of signal waveforms in an operation of a FIFO read generation buffer shown in FIG. 3.
Figure 5B:
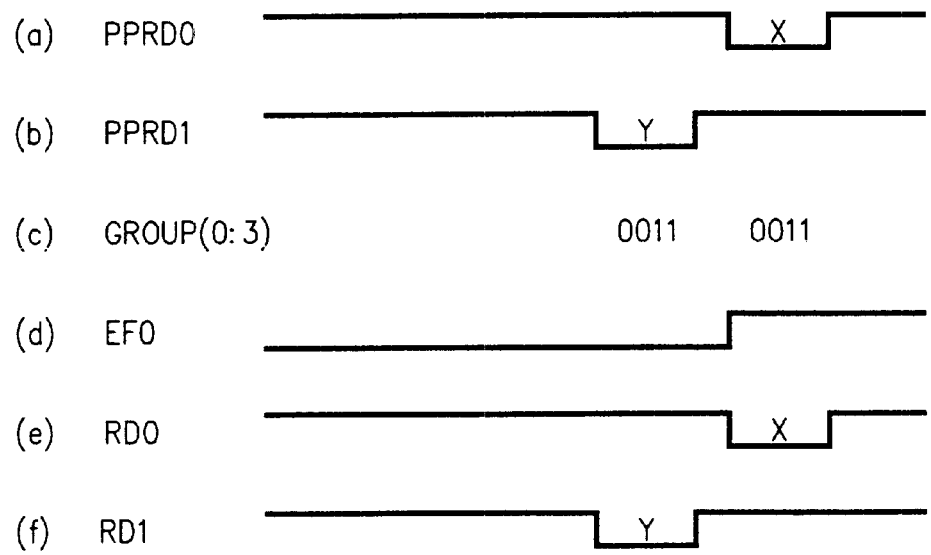

The FIFO read generation buffer 338 is similar to the FIFO write generation buffer 334 in operation. The FIFO read generation buffer 338 generates a read signal RDn based on grouping information, a read request signal PPRDn received from the read timing generator 336, and a status signal EFn of each AFIFO buffer. Examples of read signals RD are shown in FIGS. 5A and 5B. On the assumption that ports 0 and 1 are grouped, two cells are applied to group 0, and the read request signals PPRDn are sequentially received from the read timing generator 336, FIG. 5A illustrates the waveforms of read signals when it is determined from the signal EFn that the first AFIFO buffer 320 is full of idle addresses and FIG. 5B illustrates the waveforms of read signals when it is determined from the signal EFn that the first AFIFO buffer 320 is not full of idle addresses. In FIG. 5A, although ports 0 and 1 are of the same group, port 0 is higher in priority than port 1. Thus, RD0 is first generated in the location "X".

In the location of "Y", information remains to be output in the first AFIFO buffer 320 and thus RD0 is generated again instead of RD 1. In FIG. 5B, when the first AFIFO buffer 320 is empty by reading data in the location of "X", that is, EF0 is enabled, RD 1 is generated in the location of "Y" to read the address of the same group.

The read timing generator 336 continuously generates a read request signal PPRDN of a predetermined period and applies it to the FIFO read generation buffer 338.

The other components of FIG. 3, that is, an IAP 330, AFIFO buffers 320 to 326, a MUX 328, and an address checker 332 are the same in structure and operation as the counterparts shown in FIG. 1. Therefore, their description will be omitted herein.

In a cell input operation of the common memory switch according to the second preferred embodiment of the present invention, a processor (not shown) writes initial grouping information in the group information memory 316 when a switch module is initialized to set a switch operational status. The memory contents can be as follow:

TABLE 4

| write request signal | initial grouping information | | | |
|---|---|---|---|---|
| (group number) | b3 | b2 | b1 | b0 |
| 0 | 0 | 0 | 1 | 1 |
| 1 | 0 | 1 | 0 | 0 |
| 2 | 1 | 0 | 0 | 0 |

It is noted from (table 4) that output ports 0 and 1 are grouped in group 0, output port 2 is the single element in group 1, and output port 3 is a single element in group 2.

Referring to FIG. 3 and (table 4), a cell destined for group 0 is applied to input port 0, a cell destined for group 2 is applied to input port 1, another cell destined for group 0 is applied to input port 2, and a cell destined for group 1 is applied to input port 3.

The MUX 310 arranges the input cells in the input order. The header converter 318 extracts header information from the cells and generates an FIFO write request signal PPWRn. That is, FIFO write request signals PPWRn are sequentially generated in the cell input order as shown in FIG. 6A. It can be noted from FIG. 6A that PPWRn is generated according to an output port. That is, PPWR0 is generated for the first and third cells destined to group 0, PPWR2 for the second cell destined for group 2, and PPWR1 for the fourth cell destined for group 1.

The FIFO write generation buffer 334 receives the FIFO write request signal PPWRn shown in FIG. 6A and the grouping information from the group information memory 316 and determines an AFIFO buffer to be enabled in response to each PPWRn. For example, the first AFIFO 320 is selected in the location of "X" where the first cell is applied, and the fourth AFIFO buffer 326 is selected in the location of "Y" where the second cell is applied. In the location of "Z" where the third cell is applied, the first AFIFO buffer 320 is selected if it is not full. If the first AFIFO buffer 320 is full, the input cell is written in the second AFIFO buffer 322. In the location of "W" where the fourth cell is applied, the third AFIFO buffer 324 is selected. The relation between the first and third cells is shown in FIGS. 4A and 4B. Thus, its description is omitted here.

In a cell output operation, the read timing generator 336 sequentially generates address buffer enable signals, namely, FIFO read request signals PPRDn. That is, each PPRDn is applied to the FIFO read generation buffer 338 where a read signal RDn corresponding to the PPRDn is produced.

An example of generating a read signal RDn corresponding to the signal PPRDn is shown in FIG. 6B. Referring to FIG. 6B, signals PPRD2 and PPRD3 are generated for individualized port groups and RD2 and RD3 are generated in response to PPRD 2 and PPRD 3 (in the locations of "X" and "Y"), respectively. RD 0 occurs twice since output ports 0 and 1 are grouped in group 0, and generated in response to PPRD0 and PPRD1 (in the location of "X" and "Y"), the second AFIFO buffer 322 is empty, and the first AFIFO buffer 320 is full of data. On the other hand, if one valid address is stored in the first AFIFO buffer 320 and another valid address is stored in the second AFIFO buffer 322, RD 0 and RD 1 are sequentially generated. The waveforms of the signals RD0 and RD1 are shown in FIGS. 5A and 5B.

The operation of outputting cells by enabling the AFIFO buffers 320 to 326 by the signals RDn is the same as that described referring to FIG. 2. That is, the grouped AFIFO buffers 320 to 326 are Daisy-chained, thereby grouping ports in the switch.

In accordance with the present invention, a cell grouping device and a method thereof are applied to a common memory switch by sequentially writing addresses in address buffers in addition to the fundamental switching function of an ATM switch. Therefore, the efficiency of a switch module is increased and system designing is facilitated.

Furthermore, the grouped switching function is achieved by adding Daisy-chaining of the address buffers in the switch module to the basic cell switching in developing an ATM switch module or ASIC. Accordingly, the switch module can be fully used and system designing is facilitated.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A cell group processing device for a common memory switch having a plurality of output ports, which includes at least one individualized output port group, and at least one grouped output port group, wherein each of said plurality of output ports being assigned to a unique group number, said cell group processing device comprising:

a multiplexer for multiplexing cells received through a plurality of input ports;

a header converter means for sequentially receiving headers extracted from the multiplexed cells, determining whether the cells are valid, and for generating a valid verified signal and a group signal for a valid cell;

an idle address generator means for sequentially assigning idle addresses at which cells are stored in response to said valid verified signal;

a processor for providing an initial grouping information and an initial address buffer select information when a switch module is initialized;

a group information memory means including a first table for storing said initial grouping information, said group information memory means determining grouping information corresponding to a group signal stored in said first table, an address buffer select memory means including a second table for storing said initial address buffer select information, said address buffer select memory means replacing the initial address buffer select information with a next address buffer select information upon reception of the next address buffer select information, and determining address buffer select information corresponding to a group signal stored in said second table;

an address buffer select information generator means for receiving grouping information and the address buffer select information, for determining the next address buffer select information, and for outputting the next address buffer select information to said address buffer select memory means;

a plurality of address buffers enabled by said address buffer select information, for storing idle addresses assigned by the idle address generator; and, a common memory for storing the cells received from the multiplexer at the idle addresses.

2. The device of claim 1, further comprising a number of address buffers which are equal to a number of output ports, and said address buffers are individualized or grouped pending on whether a cell corresponding to an idle address to be stored is destined for an individualized output port or a grouped output port.

3. The device of claim 2, wherein said address buffer select information generator means outputs address buffer select information received from said address buffer elect memory means as next address buffer select information if the grouping information is about an individualized output port, and outputs address buffer select information for selecting an address buffer other than an address buffer enabled by said address buffer select information means among corresponding grouped address buffers as next address buffer select information if the grouping information is about a grouped output port.

4. A cell group processing device for a common memory switch having a plurality of output ports, which includes at least one individualized output port group, and at least one grouped output port group, wherein each of said plurality of output ports being assigned to a unique group number, said cell group processing device comprising:

a first multiplexer for multiplexing cells received through a plurality of input ports;

a header converter means for sequentially receiving headers extracted from the multiplexed cells, and for determining whether the cells are valid, and generating a valid verified signal and a group signal;

an idle address generator means for sequentially assigning idle addresses at which cells are stored in response to the valid verified signal;

a processor for providing an initial grouping information and an initial address buffer select information when a switch module is initialized;

a group information memory means including a first table for storing said initial grouping information, and for determining grouping information corresponding to a group signal stored in said first table;

an address buffer select memory means including a second table for storing said initial address buffer select information, and said address buffer select memory means for replacing the initial address buffer select information with a next address buffer select information upon reception of the next address buffer select information, and said address buffer select memory means determining address buffer select information corresponding to a group signal stored in said second table;

an address buffer select information generator means for receiving the grouping information and the address buffer select information, for determining the next address buffer select information, and for outputting the next address buffer select information to the address buffer select memory means;

a plurality of address buffers enabled by said address buffer select information, for storing idle addresses assigned by the idle address generator;

a read timing generator means for generating a read timing signal to sequentially enable the address buffers and reading the idle addresses stored in a plurality of address buffers;

a second multiplexer for multiplexing the idle addresses read by the read timing signal;

a common memory for storing cells received from said first multiplexer at the idle addresses and for outputting the stored cells according to the multiplexed idle addresses received from said second multiplexer;

a demultiplexer for demultiplexing the stored cells received from said common memory; and an address checker means for receiving the multiplexed idle addressed from the second multiplexer, for checking whether the idle addresses have errors, and for applying error-free idle addresses to the idle address generator for the next use.

5. The device of claim 4, wherein said plurality of address buffers are equal in number to a number of output ports, and said plurality of address buffers are individualized or grouped depending on whether a cell corresponding to an idle address to be stored is destined for an individualized output port or a grouped output port.

6. The device of claim 5, wherein said address buffer select information generator means outputs address buffer select information received from said address buffer select memory means as a next address buffer select information if the grouping information is about an individualized output port, and outputs address buffer select information for selecting an address buffer other than an address buffer enabled by the address buffer select information among corresponding grouped address buffers as next address buffer select information if the grouping information is about a grouped output port.

7. A cell group processing method for a common memory switch having a plurality of output ports grouped, a group information memory, and an address buffer select memory storing address buffer select information corresponding to each group, comprising the steps of:

receiving initial grouping information and initial address buffer select information from a processor when a switch module is initialized;

storing the initial grouping information and the initial address buffer select information in the group information memory and the address buffer select memory, respectively;

multiplexing a plurality of cells received through a plurality of input ports in the order input, determining whether each cell is valid from the header of the cell, and generating a valid verified signal and a group signal indicating an output port for which the cell is destined;

sequentially assigning idle addresses at which said plurality of cells are stored in response to the valid verified signal;

enabling address buffers corresponding to address buffer select information received from the address buffer select memory according to the group signal and storing the idle addresses in the enabled address buffers;

outputting the address buffer select information as a next address buffer select information and changing address buffer select information stored in the address buffer select memory, if the grouping information is about an individualized output port; and outputting address buffer select information for selecting an address buffer other than the enabled address buffer in an address buffer group including the enabled address buffer as next address buffer select information and changing address buffer select information stored in the address buffer select memory, if the grouping information is about a grouped output port.

8. A cell group processing device for a common memory switch having a plurality of output ports, which includes at least one individualized output port group, and at least one grouped output port group, wherein each of said plurality of output ports being assigned to a unique group number, said cell group processing device comprising:

a first multiplexer for multiplexing cells received through a plurality of input ports;

a header converter means for sequentially receiving headers extracted from the multiplexed cells, for determining whether the cells are valid, and generating a valid verified signal and a write request signal;

an idle address generator means for sequentially assigning idle addresses at which cells are stored in response to the valid verified signal;

a group information memory means including a first table for storing initial grouping information received from a processor when a switch module is initialized, and said group information memory means determining grouping information for an output port group indicated by the write request signal stored in said first table;

a read timing generator means for generating a read request signal corresponding to each address buffer in every predetermined periods;

a read generation buffer means for generating a read signal for enabling an address buffer corresponding to the grouping information based on the status signal of each address buffer upon reception of the read request signal;

a plurality of address buffers corresponding to said plurality of output ports on a one to one basis, and said plurality of address buffers are individualized or grouped according to the corresponding output ports, for being enabled by the write signal to store the idle addresses and being enabled by the read signal to output the stored idle addresses;

a second multiplexer for multiplexing the idle addresses read from the address buffers by the read request signal;

a common memory for storing cells received from said first multiplexer at the idle addresses and outputting the stored cells according to the multiplexed idle addresses received from said second multiplexer;

a demultiplexer for demultiplexing the cells received from said common memory; and, an address checker for receiving the multiplexed idle addressed from said second multiplexer, checking whether the idle addresses have errors, and applying error-free idle addresses to the idle address generator for a next use.

9. A cell group processing method for a common memory switch having output ports grouped and a group information memory storing grouping information for each output port group, comprising the steps of:

receiving initial grouping information from a processor when a switch module is initialized and storing the initial grouping information in the group information memory;

multiplexing cells received through input ports in the input order, determining whether each cell is valid from the header of the cell, and generating a valid verified signal and a write request signal corresponding to an output port for which the cell is destined;

sequentially assigning idle addresses at which the cells are stored in response to the valid verified signal and storing the cells corresponding to the valid verified signal at the assigned idle addresses;

determining grouping information for an output port corresponding to the write request signal in the group information memory;

generating a write signal for enabling an address buffer corresponding to the determined grouping information by the status signal of each address buffer upon reception of the write request signal and storing the assigned idle addresses;

generating a read request signal corresponding to each address buffer in every predetermined periods, generating a read signal for enabling an address buffer corresponding to the grouping information by the status signal of each address buffer upon reception of the read request signal, and outputting a corresponding idle address multiplexing the idle addresses read from the address buffers by the read signal and outputting cells at the corresponding idle addresses of the common memory in the order of receiving the multiplexed idle addresses;

demultiplexing the cells received from the common memory; and determining whether the idle multiplexed addresses has errors to reassign the idle addresses for the next use.

* * * * *